US010545386B2

(12) United States Patent
Qin et al.

(10) Patent No.: US 10,545,386 B2
(45) Date of Patent: Jan. 28, 2020

(54) DISPLAY PANEL INCLUDING TOUCH SIGNAL LINES ARRANGED IN DIFFERENT COLUMN SPACING REGIONS, AND DISPLAY DEVICE INCLUDING THE SAME

(71) Applicant: Shanghai AVIC OPTO Electronics Co., Ltd., Shanghai (CN)

(72) Inventors: Dandan Qin, Shanghai (CN); Xiaodong Luo, Shanghai (CN); Zhaokeng Cao, Shanghai (CN); Boping Shen, Shanghai (CN); Xiufeng Zhou, Shanghai (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/106,008

(22) Filed: Aug. 21, 2018

(65) Prior Publication Data
US 2018/0373104 A1    Dec. 27, 2018

(30) Foreign Application Priority Data
Apr. 28, 2018   (CN) .......................... 2018 1 0403637

(51) Int. Cl.
*G09G 3/30*       (2006.01)
*G02F 1/1362*    (2006.01)
(Continued)

(52) U.S. Cl.
CPC ...... *G02F 1/136227* (2013.01); *G02F 1/1368* (2013.01); *G02F 1/13338* (2013.01);
(Continued)

(58) Field of Classification Search
CPC .. G09G 3/30; G09G 3/36; G09G 5/00; G09G 5/10; G06F 3/038; G02F 1/1333; G02F 1/1343
See application file for complete search history.

(56) References Cited

U.S. PATENT DOCUMENTS

2011/0267571 A1\* 11/2011 Lee ..................... H01L 27/1214
349/141
2013/0027437 A1\* 1/2013 Gu ........................ G09G 3/3607
345/690

(Continued)

FOREIGN PATENT DOCUMENTS

CN         107390441 A    11/2017
CN         107562270 A    1/2018

*Primary Examiner* — Pegeman Karimi
(74) *Attorney, Agent, or Firm* — Kilpatrick Townsend & Stockton, LLP

(57) ABSTRACT

The present disclosure provides a display panel and a display device. The display panel includes a plurality of sub-pixels arranged in an array. A region between any two adjacent columns of sub-pixels is a column spacing region. The column spacing region includes a first column spacing region with signal touch line and a second column spacing region. In each column of sub-pixels adjacent to the first column spacing region, adjacent ends of any two adjacent sub-pixels close to the first column spacing region are aligned in a sub-pixel column direction. In each column of sub-pixels adjacent to the second column spacing region, adjacent ends of at least two adjacent sub-pixels close to the second column spacing region are misaligned in the sub-pixel column direction.

20 Claims, 10 Drawing Sheets

(51) Int. Cl.
*G06F 3/044* (2006.01)
*G06F 3/041* (2006.01)
*G02F 1/1333* (2006.01)
*G02F 1/1368* (2006.01)
*G02F 1/1343* (2006.01)
*G02F 1/1337* (2006.01)

(52) U.S. Cl.
CPC .. *G02F 1/134336* (2013.01); *G02F 1/136286* (2013.01); *G06F 3/044* (2013.01); *G06F 3/0412* (2013.01); *G06F 3/0416* (2013.01); *G02F 1/133707* (2013.01); *G02F 1/134363* (2013.01); *G02F 2001/13685* (2013.01); *G02F 2001/134345* (2013.01); *G02F 2201/123* (2013.01); *G02F 2201/52* (2013.01)

(56) References Cited

U.S. PATENT DOCUMENTS

| | | | |
|---|---|---|---|
| 2014/0247247 A1* | 9/2014 | Hotelling | G02F 1/13338 345/174 |
| 2015/0277194 A1* | 10/2015 | Saitoh | G02F 1/133753 349/144 |
| 2017/0163975 A1* | 6/2017 | Jin | H04N 13/305 |
| 2019/0227391 A1* | 7/2019 | Kamitani | G02F 1/133512 |

\* cited by examiner

DISPLAY PANEL INCLUDING TOUCH SIGNAL LINES ARRANGED IN DIFFERENT COLUMN SPACING REGIONS, AND DISPLAY DEVICE INCLUDING THE SAME

CROSS-REFERENCE TO RELATED APPLICATIONS

The present application claims priority to Chinese Patent Application No. 201810403637.3, filed on Apr. 28, 2018, the content of which is incorporated herein by reference in its entirety.

TECHNICAL FIELD

The present disclosure relates to display technology, and particularly, to a display panel and a display device.

BACKGROUND

With the rapid development of the display technology, liquid crystal display devices have been widely used in notebook computers, flat panel televisions, digital cameras and other electronic products due to their advantages of small size, light weight, and the like. The current liquid crystal display panel includes sub-pixels defined by intersecting scan lines with data lines in an insulation manner. The plurality of sub-pixels is arranged in an array. Each sub-pixel includes a drain electrode of a thin film transistor and a pixel electrode. A planarization layer, a touch signal line, and an insulation layer are sequentially disposed between the pixel electrode and the drain electrode. The pixel electrode is connected to the drain electrode via a drain hole in the planarization layer and the insulation layer. The touch signal line is located between two adjacent columns of sub-pixels. In some structures, there may be residual metal in the drain hole in the planarization layer due to the process problem, which can result in a short circuit between the touch signal line and the pixel electrode, thereby causing display defects.

SUMMARY

The present disclosure provides a display panel and a display device, aiming to reduce a probability that there is residual metal of the touch signal line in the drain hole of the planarization layer, thereby improving the display effects.

In one embodiment of the present disclosure, a display panel is provided. The display panel includes an array substrate. The array substrate includes: a base substrate; a source-drain metal layer; a planarization layer; and a touch signal line. The source-drain metal layer, the planarization layer, and the touch signal line are sequentially stacked on the base substrate in a direction perpendicular to the base substrate. The source-drain metal layer includes a drain electrode, the planarization layer includes a drain hole, and the touch signal line is in direct contact with the planarization layer. The array substrate further includes a pixel electrode, and the pixel electrode is electrically connected to the drain electrode through the drain hole. The array substrate includes a plurality of sub-pixels defined by intersecting a plurality of scan lines with a plurality of data lines in an insulation manner, the plurality of sub-pixels is arranged in an array, and a region between any two adjacent columns of sub-pixels is a column spacing region. The column spacing region includes a first column spacing region, the touch signal line is located in the first column spacing region, and in each column of sub-pixels adjacent to the first column spacing region, adjacent ends of any two adjacent sub-pixels close to the first column spacing region are aligned in a sub-pixel column direction. The column spacing region further includes a second column spacing region, in each column of sub-pixels adjacent to the second column spacing region, adjacent ends of at least two adjacent sub-pixels close to the second column spacing region are misaligned in the sub-pixel column direction.

In another embodiment of the present disclosure, a display device is provided. The display device includes a display panel. The display panel includes an array substrate. The array substrate includes: a base substrate; a source-drain metal layer; a planarization layer; and a touch signal line. The source-drain metal layer, the planarization layer, and the touch signal line are sequentially stacked on the base substrate in a direction perpendicular to the base substrate. The source-drain metal layer includes a drain electrode, the planarization layer includes a drain hole, and the touch signal line is in direct contact with the planarization layer. The array substrate further includes a pixel electrode, and the pixel electrode is electrically connected to the drain electrode through the drain hole. The array substrate includes a plurality of sub-pixels defined by intersecting a plurality of scan lines with a plurality of data lines in an insulation manner, the plurality of sub-pixels is arranged in an array, and a region between any two adjacent columns of sub-pixels is a column spacing region. The column spacing region includes a first column spacing region, the touch signal line is located in the first column spacing region, and in each column of sub-pixels adjacent to the first column spacing region, adjacent ends of any two adjacent sub-pixels close to the first column spacing region are aligned in a sub-pixel column direction. The column spacing region further includes a second column spacing region, in each column of sub-pixels adjacent to the second column spacing region, adjacent ends of at least two adjacent sub-pixels close to the second column spacing region are misaligned in the sub-pixel column direction.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure.

DESCRIPTION OF EMBODIMENTS

In order to better clarify the purposes, technical solutions and disadvantages of the embodiments of the present disclosure, the embodiments of the present disclosure are described in details with reference to the drawings as follows. It should be clear that the described embodiments are merely part of the embodiments of the present disclosure rather than all of the embodiments.

The terms used in the embodiments of the present disclosure are merely for the purpose of describing the embodiments, but not intended to limit the present disclosure. As used in the embodiments of the disclosure and the appended claims, the singular forms "a", "an", and "the" aim to include plural forms as well, unless the context indicates otherwise.

Figure 1:
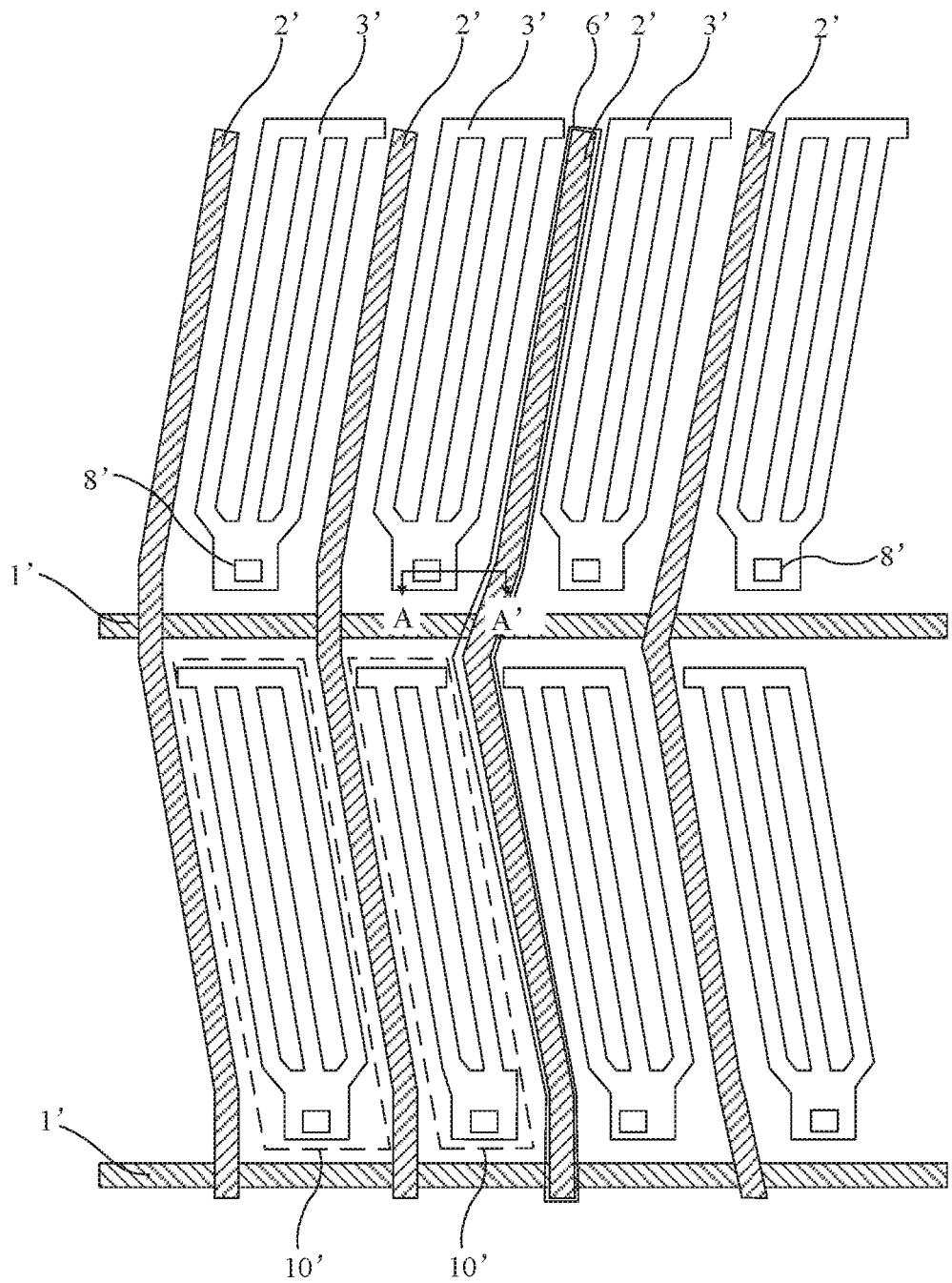
FIG. 1 is a structural schematic diagram of a partial area of a display panel provided in the related art.
Figure 2:
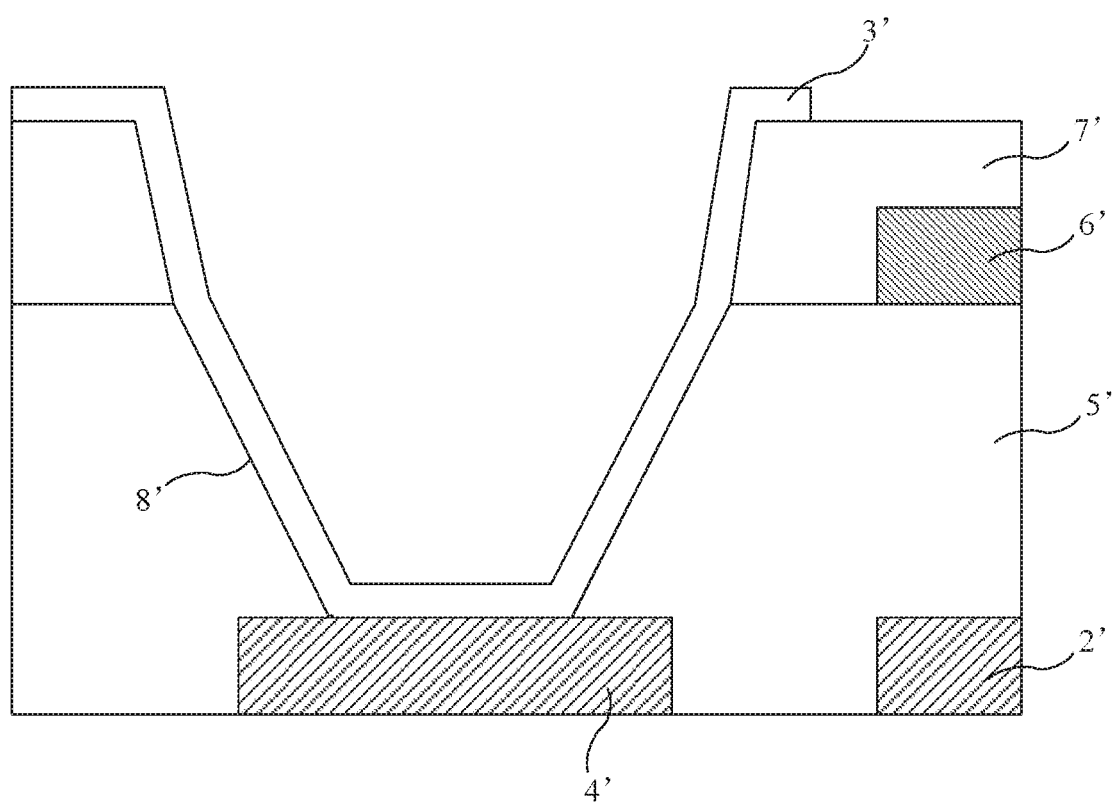
FIG. 2 is a structural sectional view along AA' in FIG. 1.

In order to further illustrate the beneficial effects of the embodiments of the present disclosure, before introducing the embodiments of the present disclosure, the defects of the related art are illustrated, as shown in FIG. 1 and FIG. 2. FIG. 1 is a structural schematic diagram of a partial area of a display panel provided in the related art, and FIG. 2 is a structural sectional view along AA' in FIG. 1. The display panel includes a plurality of sub-pixels 10' defined by intersecting a plurality of scan lines 1' with a plurality of data lines 2' in an insulation manner. The plurality of sub-pixels 10' is arranged in an array, each sub-pixel 10' includes a pixel electrode 3' and a drain electrode 4' of a thin film transistor. A planarization layer 5', a touch signal line 6' and an insulation layer 7' are sequentially disposed between the pixel electrode 3' and the drain electrode 4'. The pixel electrode 3' is connected to the drain electrode 4' through a drain hole 8' in the planarization layer 5' and the insulation layer 7'. The touch signal line 6' is located between two adjacent columns of sub-pixel 10'. In some structures, for example the sub-pixels 10' have different widths, the touch signal 6' may has a great turning at some positions, and thus is very close to the drain hole 8' at the turning. Therefore, during manufacturing the touch signal line 6', there may be residual metal in the drain hole 8' in the planarization layer 5' due to process problems, which can further result in a short circuit between the touch signal line 6' and the pixel electrode 3', thereby causing display defects.

Figure 3:
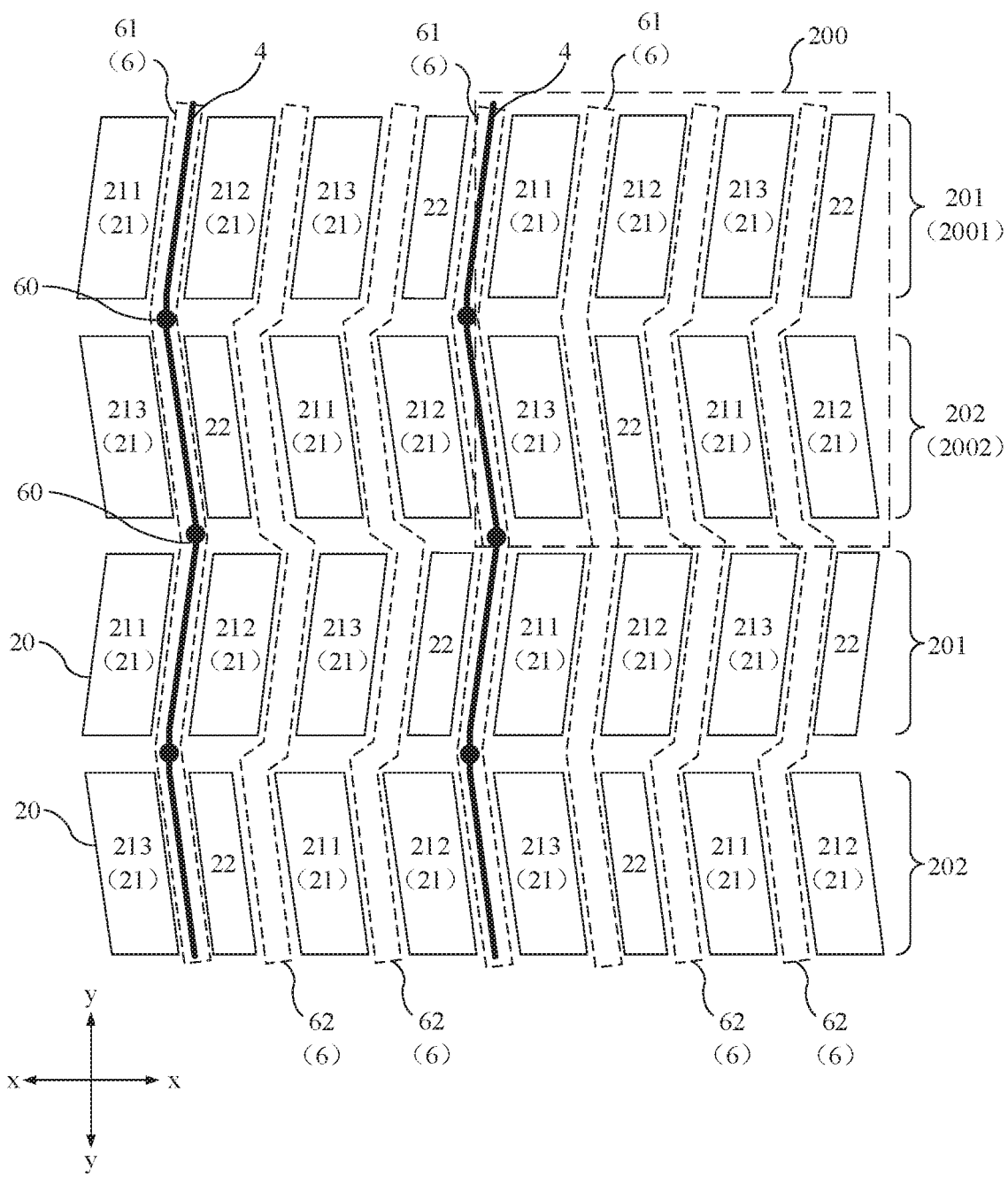
FIG. 3 is a structural schematic diagram of a partial area of a display panel according to an embodiment of the present disclosure.
Figure 4:
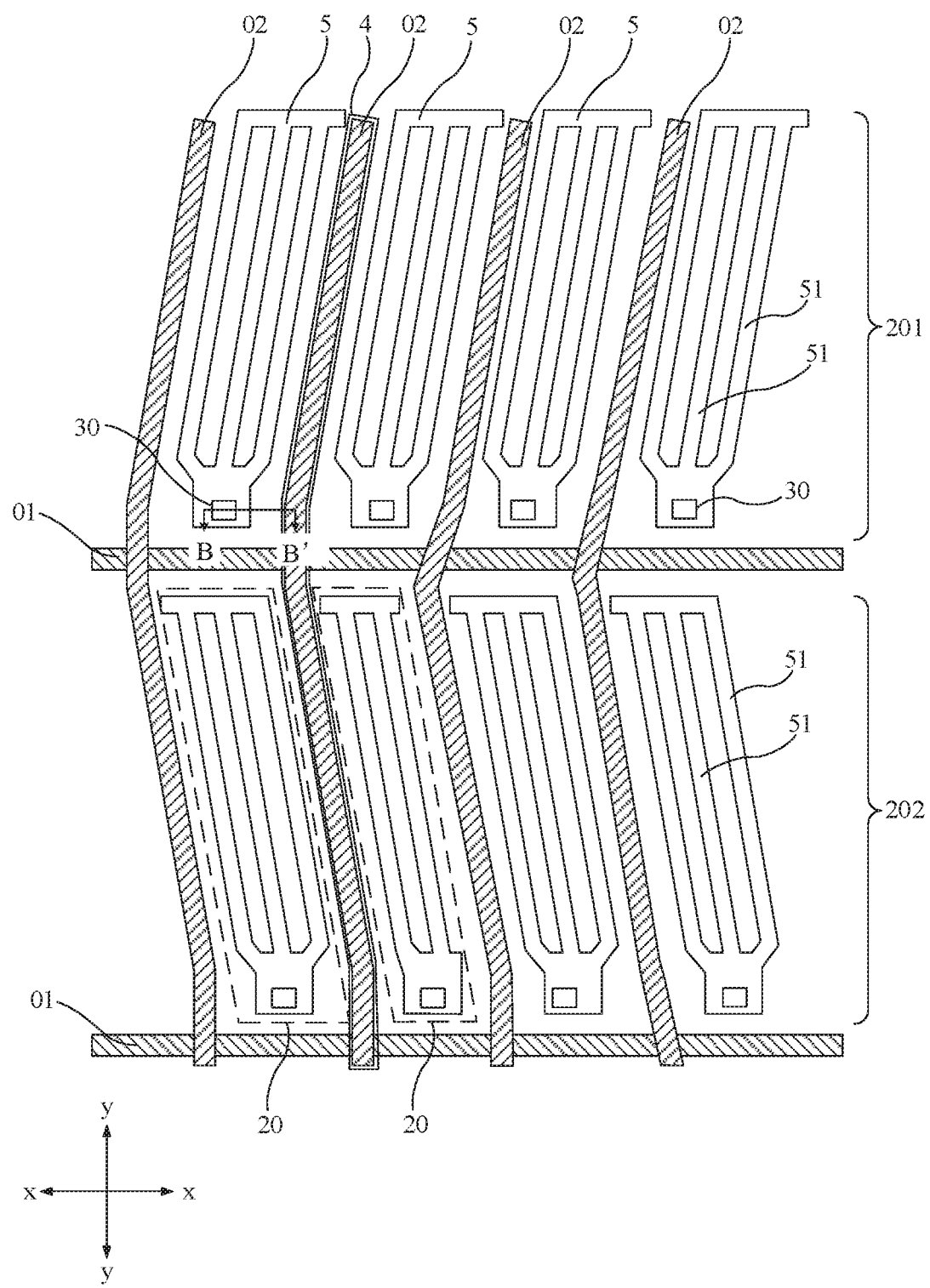
FIG. 4 is a partially enlarged diagram of a portion in FIG. 3.
Figure 5:
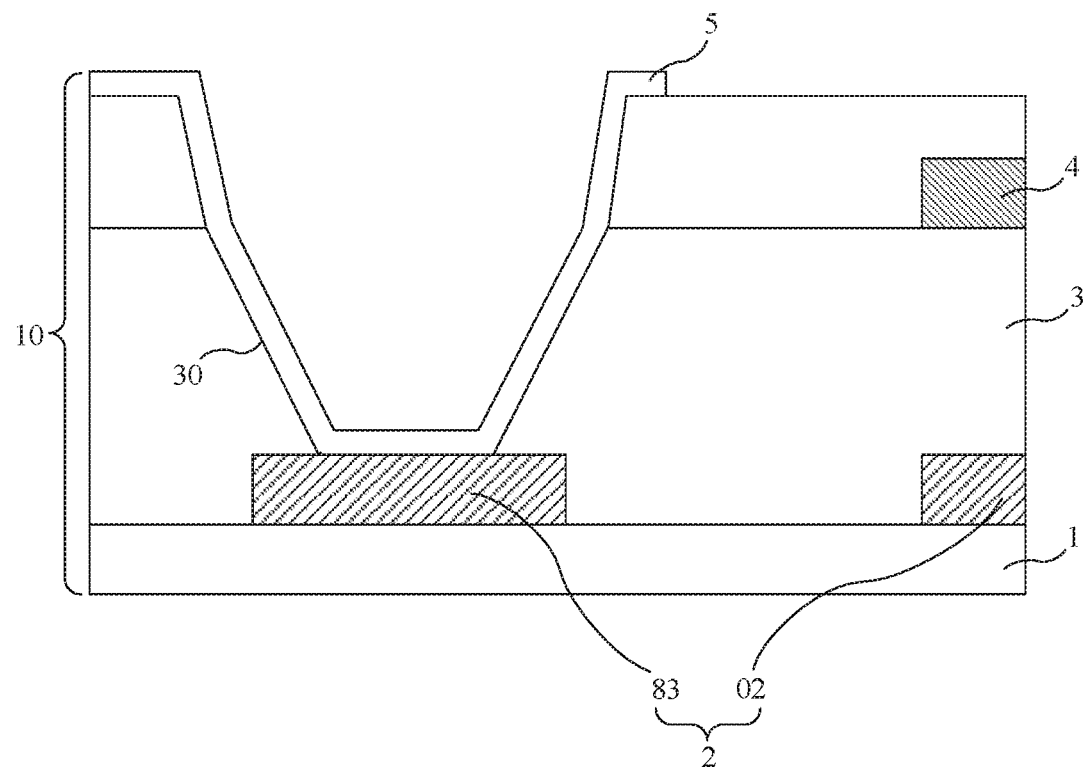
FIG. 5 is a structural sectional view along line BB' in FIG. 4.

FIG. 3 is a structural schematic diagram of a partial area of a display panel according to an embodiment of the present disclosure, FIG. 4 is a partially enlarged diagram of a portion in FIG. 3, and FIG. 5 is a structural sectional view along line BB' in FIG. 4. The display panel provided by the embodiment of the present disclosure includes an array substrate 10. The array substrate 10 includes a base substrate 1. The array substrate 10 also includes a source-drain metal layer 2, a planarization layer 3, and a touch signal line 4 that are sequentially stacked in a direction perpendicular to the base substrate 1. The source-drain metal layer 2 includes a drain electrode 83. The planarization layer 3 includes a drain hole 30. The touch signal line 4 is in direct contact with the planarization layer 3. The array substrate 10 further includes a pixel electrode 5. The pixel electrode 5 is electrically connected to the drain electrode 83 through the drain hole 30. The array substrate 10 includes a plurality of sub-pixels 20 defined by intersecting a plurality of scan lines 01 with a plurality of data lines 02 in an insulation manner. The plurality of sub-pixels 20 is arranged in an array. A region between any two adjacent columns of sub-pixels 20 is referred to as a column spacing region 6. The column spacing region 6 includes a first column spacing region 61 and a second column spacing region 62. The touch signal line 4 is located in the first column spacing region 61. In each column of sub-pixels 20 adjacent to the first column spacing region 61, adjacent ends of any two adjacent sub-pixels 20 close to the first column spacing region 61 are aligned in a sub-pixel column direction y. In each column of sub-pixels 20 adjacent to the second column spacing region 62, adjacent ends of at least two adjacent sub-pixels 20 close to the second column spacing region 62 are misaligned in the sub-pixel column direction y.

In one embodiment, FIG. 3 merely illustrates the relation of the sub-pixels 20, the touch signal line 4, and the column spacing region 6, and no other specific structure. In FIGS. 3 and 4, an edge of the sub-pixel 20 is defined by the pixel electrode 5. For example, the end of the sub-pixel 20 close to the first column spacing region 61 refers to an end of the pixel electrode 5 of the sub-pixel 20 close to the first column spacing region 61. As shown in FIGS. 3 and 4, since some sub-pixels 20 has a smaller width in the sub-pixel row direction x, left and right ends of one of these sub-pixel 20 cannot be aligned with the left and right ends of other sub-pixels 20 in the same column, and further the left and right ends of the sub-pixels 20 in another column cannot be aligned, thereby forming the second column spacing region 62. The second column spacing region 62 is a spacing region having a larger turning in the sub-pixel column direction y. In addition, even some sub-pixels 20 have the smaller width in the sub-pixel row direction x, the first column spacing region 61 still exists through an arrangement of the sub-pixels 20. In a left column of sub-pixels 20 close to the first column spacing region 61, the right-most ends of the pixel electrodes 5 of any two adjacent sub-pixels 20 are aligned in the sub-pixel column direction y. In a right column of sub-pixels 20 close to the first column spacing region 61, the left-most ends of the pixel electrodes 5 of any two adjacent sub-pixels 20 are aligned in the sub-pixel column direction y. Therefore, the first column spacing region 61 is a spacing region having a smaller turning or even no turning in the sub-pixel column direction y. The touch signal line 4 is disposed in the first column spacing region 61, which can avoid a larger turning of the touch signal line 4 in the sub-pixel column direction y. As shown in FIG. 5, even if the touch signal line 4 is deviated from a preset position because of a processing error or the like, a probability that there is residual metal of the touch signal line 4 in the drain hole 30 of the planarization layer 3 can be lowered due to a relatively long distance between the touch signal line 4 and the drain hole 30 in the planarization layer 3. In the embodiment of the present disclosure, for example, the plane distance between the touch signal line 4 and the drain hole 30 in the planarization layer 3 is greater than 4 μm. In addition, it should be noted that there are a plurality of first column spacing regions 61 in the entire display panel, but it is unnecessary to provide the touch signal line 4 in each first column spacing region 61.

In the display panel according to the embodiment of the present disclosure, the touch signal line is disposed in the first column spacing region having a smaller turning or even no turning, avoiding a great turning of the touch signal line in the sub-pixel column direction. Even the touch signal line is deviated from the preset position because of the processing error or the like, a probability that there is residual metal of the touch signal line in the drain hole of the planarization layer can be lowered due to the relatively long distance between the touch signal line and the drain hole in the planarization layer. In this way, the related display defects can be improved.

Figure 6:
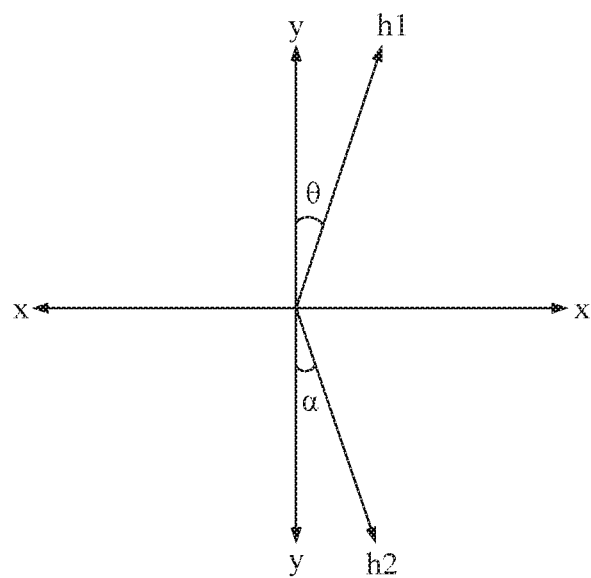
FIG. 6 is a schematic diagram of extending directions of stripe-liked structures in the pixel electrode of FIG. 4.

FIG. 6 is a schematic diagram of the extending directions of strip-liked structures in the pixel electrode of FIG. 4. The sub-pixels 20 include a first row of sub-pixels 201 and a second row of sub-pixels 202 that are alternately arranged in the sub-pixel column direction y. Each sub-pixel 20 includes a corresponding pixel electrode 5, and each pixel electrode 5 includes strip-liked structures 51. Each pixel electrode 5 can include a plurality of juxtaposed strip-liked structures 51. The strip-liked structures 51 are used to generate a lateral electric field between the common electrode and the stripe-liked structures 51, so as to drive a deflection of the liquid crystal molecules. In the first row of sub-pixels 201, the strip-liked structures 51 of each pixel electrode 5 extend along a first direction h1, and the first direction h1 and the sub-pixel column direction y enclose an angle of +θ satisfying 3°≤θ≤20°. In the second row of sub-pixels 202, the strip-liked structures of each pixel electrode 5 extend along a second direction h2, and the second direction h2 and the sub-pixel column direction y enclose an angle of −α satisfying 3°≤α≤20°.

If all of the pixel electrodes 5 of the sub-pixels 20 in the display panel extend in a same direction, accordingly, the liquid crystals in the display panel accordingly only have one rotation direction. In this setting, when the screen is viewed within a range of oblique viewing angles, a phenomenon of color cast will appear on the screen. In the embodiment of the present disclosure, since the pixel electrodes 5 of the sub-pixels 20 in the first row 201 of sub-pixels 201 and in the second row of the sub-pixels 202 extend in different directions, the liquid crystals can have two opposite rotation directions, so that the range of viewing angles can be increased, thereby significantly reducing the color cast in the range of oblique viewing angles.

By limiting the minimum values of θ and α to 3°, it is possible to prevent θ and α from being too small, thereby avoiding that the pixel electrodes 5 in the first row of sub-pixels 201 and the second row of sub-pixels 202 all extend in a direction approaching the sub-pixel column direction y, which would otherwise make the liquid crystals have only one rotation direction. The maximum values of θ and α can be further set to be 20°, so as to prevent each pixel electrode 5 from occupying a large space in the sub-pixel row direction x, which would otherwise result in a decrease in pixel density.

When θ and α are set within the above-mentioned angle range, even if the pixel electrode 5 is deviated from its pre-set position due to misalignment or the like, it is still can be ensured that there is an appropriate angle between the extending direction of the pixel electrode 5 and the sub-pixel column direction y. For example, it can be ensured that both θ and α are in a range of greater than or equal to 5° and less than or equal to 10°, such as 7°. In such range, the pixel electrodes 5 in both the first row of sub-pixels 201 and the second row of sub-pixels 202 can extend in different directions, and the pixel density can be increased.

In an embodiment, θ=α, i.e., the first direction h1 and second direction h2 are symmetric with respect to the sub-pixel row direction x, thereby reducing the complexity of the process and simplifying the control of process accuracy.

It should be noted that, "+" and "−" as described above are merely intended to indicate that the first direction h1 and the second direction h2 point to different orientations, but not intended to be a limit of the positive and negative values of θ and α. For example, a positive value indicates that the direction points upwards, and a negative value indicates that the direction points downwards. It can be understood that the above expression "the first direction h1 and the sub-pixel column direction y enclose an angle of +θ, the second direction h2 and the sub-pixel column direction y enclose an angle of −α" can also mean that "the first direction h1 and the sub-pixel column direction y enclose an angle of −θ, the second direction h2 and the sub-pixel column direction y enclose an angle of +α".

In another possible embodiment, the angle of θ between the first direction h1 and the sub-pixel column direction y can be unequal to the angle of α between the second direction h2 and the sub-pixel column direction y, i.e., the first direction h1 and the second direction h2 are not symmetric with respect to the sub-pixel row direction x. When rubbing the liquid crystals, the rubbing direction can be changed so as to have a same included angle with both the first direction h1 and the second direction h2, thereby reducing light leakage caused by a rubbing toward a direction of the photo spacer in the related art and enhancing the contrast. In addition, it should also be noted that the values of θ and α can be specified according to actual requirements, but are not specifically limited in the embodiments of the present disclosure. For example, in the first row of sub-pixels 201, the angle between the extending direction of the pixel electrode 5 of each sub-pixel 20 and the sub-pixel column direction y is +5°, and in the second row of sub-pixels 202, the angle between the extending direction of the pixel electrode 5 of each sub-pixel 20 and the sub-pixel column direction y is −7°. In another embodiment, in the first row of sub-pixels 201, the angle between the extending direction of the pixel electrode 5 of each sub-pixel 20 and the sub-pixel column direction y is +5°, and in the second row of sub-pixels 202, the angle between the extending direction of the pixel electrode 5 of each sub-pixel 20 and the sub-pixel column direction y is −5°.

Figure 7:
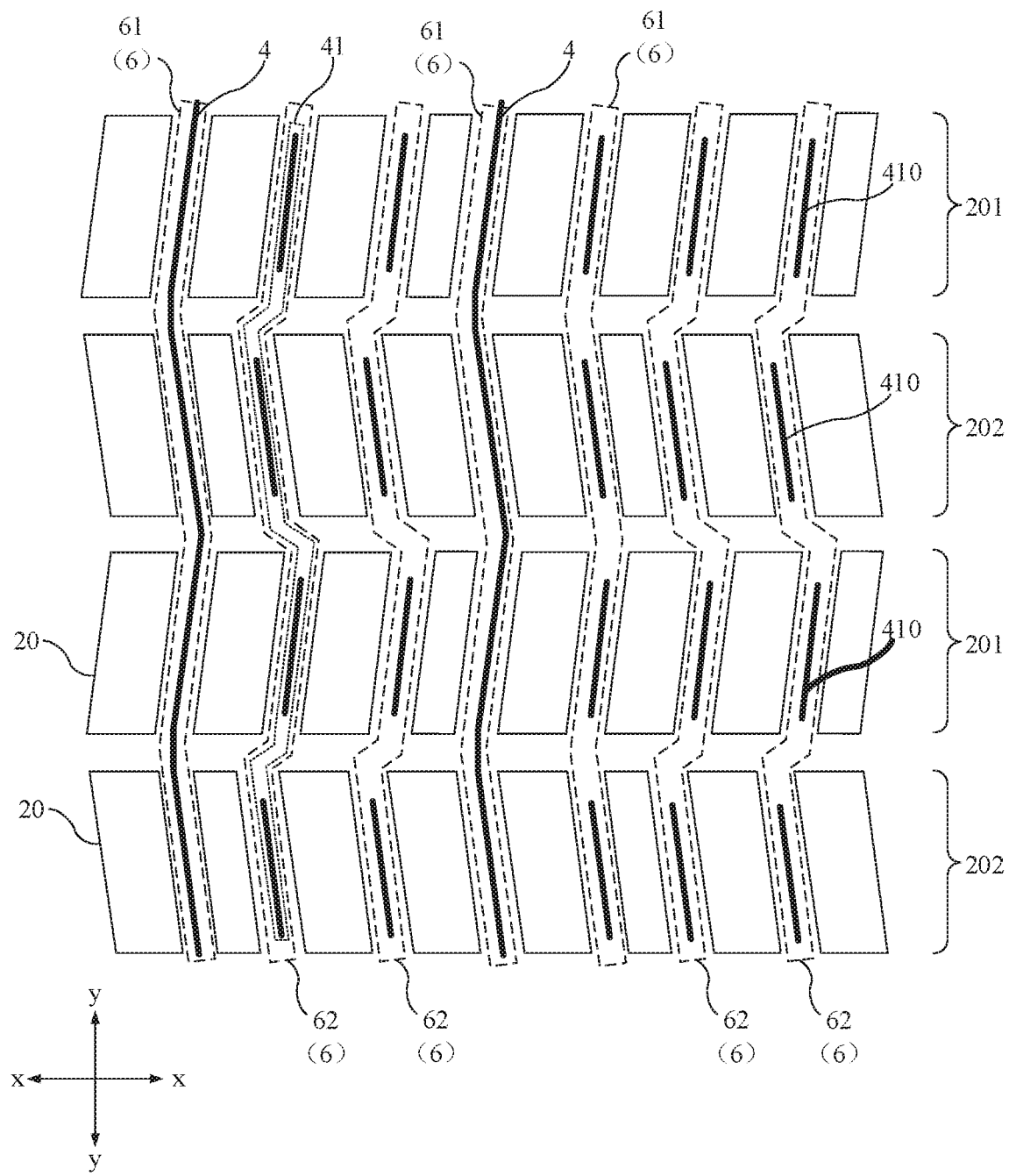
FIG. 7 is a structural schematic diagram of a partial area of a display panel according to another embodiment of the present disclosure.

FIG. 7 is a structural schematic diagram of a partial area of a display panel according to another embodiment of the present disclosure. In this embodiment, a first virtual touch signal line 41 is provided in a second column spacing region 62. Each first virtual touch signal line 41 includes a plurality of line segments 410 insulated from one another.

In one embodiment, the first virtual touch signal line 41 is not used for transmitting a touch signal, but is only used to balance the electric fields between the sub-pixels 20, so as to avoid different electric fields of the sub-pixels 20 caused by the arrangement of the touch signal lines 4, which would otherwise result in the display unevenness. Since the first virtual touch signal lines 41 do not transmit signals, each first virtual touch signal line 41 can include a plurality of line segments 410 insulated from one another. An effect of balancing the electric fields can be achieved by arranging each line segment 410 between two adjacent pixel electrodes. Since the line segments 410 are not connected to each other, even if the first virtual touch signal line 41 is arranged in the second column spacing region 62, there would not be residual metal in the drain hole of the planarization layer due to the great turning of the second column spacing region 62 during manufacturing the first virtual touch signal line 41.

Figure 8:
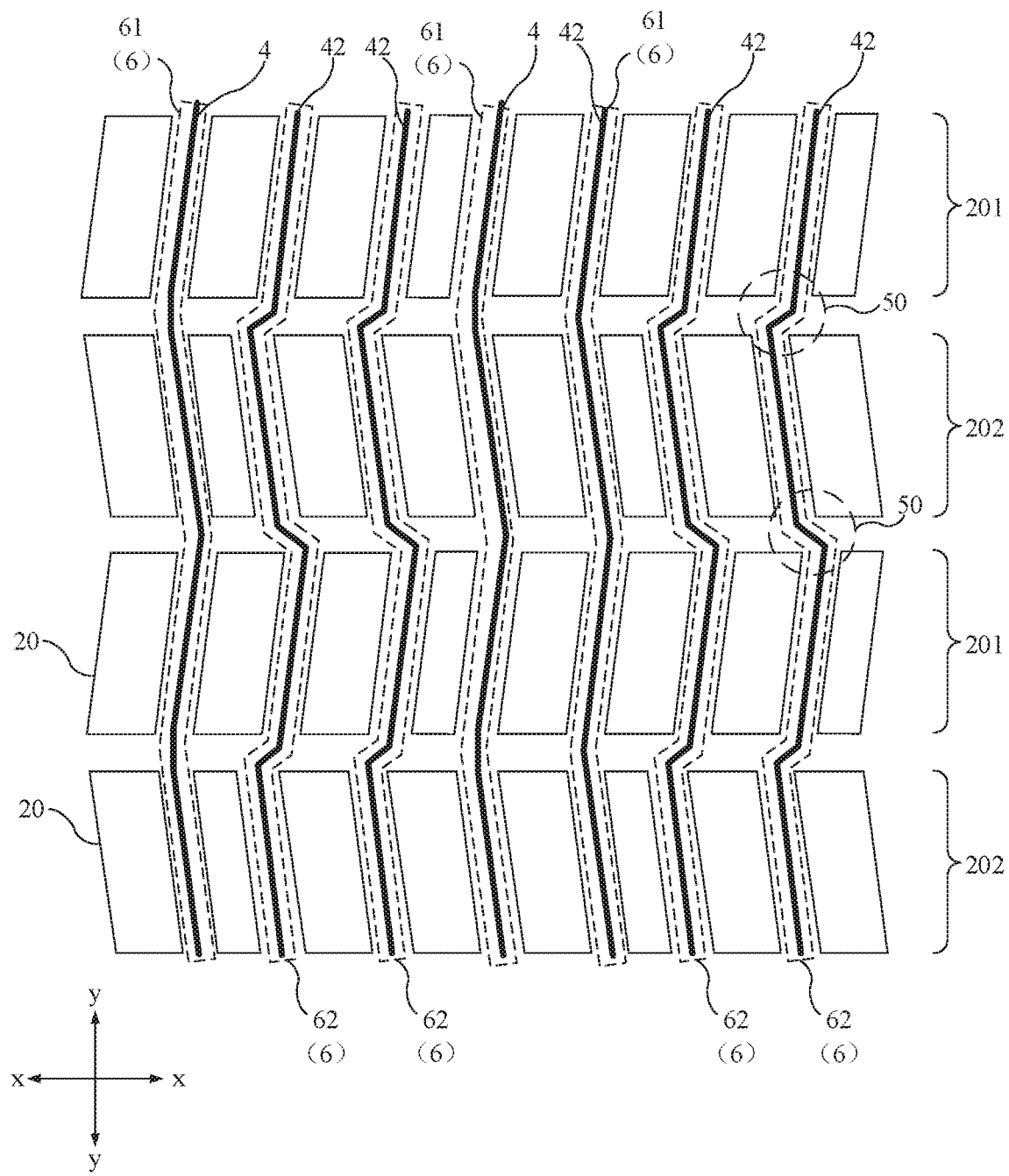
FIG. 8 is a schematic structural diagram of a partial area of a display panel according to another embodiment of the present disclosure.

As shown in FIG. 7 and FIG. 8, which is a schematic structural diagram of a partial area of a display panel according to another embodiment of the present disclosure, a first virtual touch signal line 41 or a second virtual touch signal line 42 is disposed in any column spacing region 6 other than the column spacing regions 6 provided with the touch signal lines 4. Each first virtual touch signal line 41 includes a plurality of line segments 410 insulated from one another, and each second virtual touch signal line 42 includes a continuously extending strip-liked signal line. FIG. 7 merely shows the case where the first virtual touch signal lines 41 are provided, and FIG. 8 merely shows the case where the second virtual touch signal lines 42 are provided. However, the embodiments of the present disclosure do not have limit on this. For example, the second virtual touch signal line 42 can be provided in the first column spacing region 61 where the touch signal line 4 is not provided, and the first virtual touch signal line 41 can be provided in the second column spacing region 62. As shown in FIG. 8, as regards the second virtual touch signal line 42 in the second column spacing region 62, in each column of sub-pixels 20 adjacent to the second column spacing region 62, a portion where adjacent ends of any two adjacent sub-pixels 20 close to the second column spacing region 62 are misaligned in a sub-pixel column direction y, is referred as to a turning position 50. The second virtual touch signal line 42 has a smaller width at the turning position 50 than width at other positions, and/or, the second virtual touch signal line 42 has a smaller thickness at the turning position 50 than thickness at other positions.

In one embodiment, at the turning position 50, the second virtual touch signal line 42 is close to the drain hole, and the width of the second virtual touch signal line 42 at the turning position 50 is smaller than the width at other positions, so as to reduce the probability of metal being remained in the drain hole of the planarization layer in the process of manufacturing the second virtual touch signal line 42. In addition, since the thickness of the second virtual touch signal line 42 at the turning position 50 is smaller than the thickness at the other positions, even there is residual metal in the drain hole of the planarization layer in the process of manufacturing the second virtual touch signal line 42, the metal with a relatively smaller thickness at this position can be etched away by other subsequent etching processes. Since the second virtual touch signal line 42 does not transmit signal, even if it is disconnected at the turning position 50 by the etching, the display will not be adversely affected. It should be noted that the principle of arranging the virtual touch signal lines is in that the virtual touch signal lines are arranged between any adjacent columns of sub-pixels 20 where no touch signal line 4 is disposed. This can achieve the optimal effect of balancing the electric fields of the sub-pixels 20.

Figure 9:
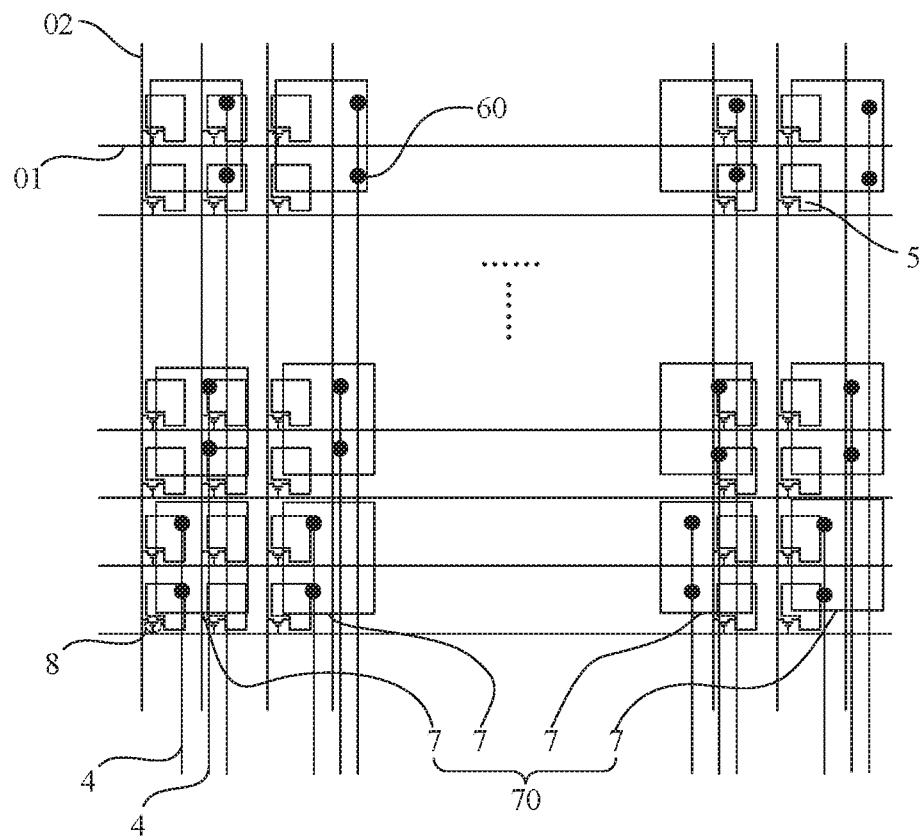
FIG. 9 is another structural schematic diagram of the display panel corresponding to FIG. 3.
Figure 10:
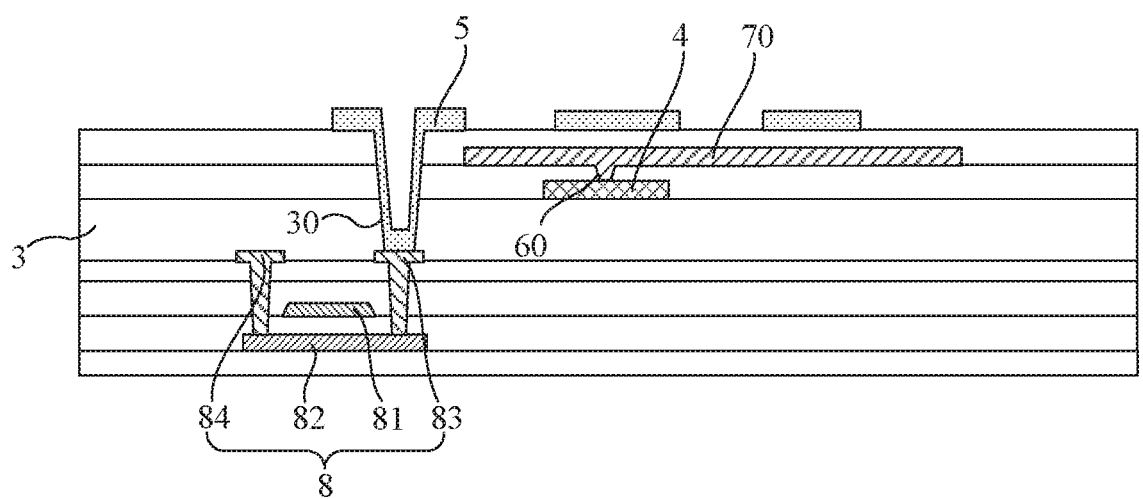
FIG. 10 is a structural sectional view of a display panel according to an embodiment of the present disclosure.

FIG. 9 is another structural schematic diagram of the display panel corresponding to FIG. 3, and FIG. 10 is a structural sectional view of a display panel according to an embodiment of the present disclosure. The display panel further includes a self-capacitive touch electrode layer 70. The self-capacitive touch electrode layer 70 includes a plurality of touch electrode blocks 7 arranged in an array. Each touch signal line 4 is electrically connected to a touch electrode block 7 through a first through-hole 60. The first through-holes 60 are distributed along the touch signal line 4.

In one embodiment, each touch electrode block 7 transmits a touch signal through a single touch signal line 4, so as to achieve touch detection function. Each sub-pixel in the display panel can include a thin film transistor 8 and a pixel electrode 5. The thin film transistor 8 includes a gate electrode 81, an active layer 82, a drain electrode 83, and a source electrode 84. The pixel electrode 5 is connected to the drain electrode 83 of the thin film transistor 8. A planarization layer 3 is provided between the drain electrode 83 and the pixel electrode 5. The planarization layer 3 is provided with a drain hole 30 used to provide a channel for the connection between the pixel electrode 5 and the drain electrode 83. In an implementable embodiment of the present disclosure, the touch electrode layer 70 is reused as a common electrode, and the first through-holes 60 are through-holes in an insulation layer between the touch electrode layer 70 and the touch signal line 4. The gate electrode 81 of the thin film transistor 8 is connected to a corresponding scan line 01, and the source electrode 84 of the thin film transistor 8 is connected to a corresponding data line 02. In a display phase, when a signal over the scan line 01 is at a turn-on level, the thin film transistor 8 in a corresponding row of sub-pixels is controlled to be turned on, so that a data voltage on the corresponding data line 02 is transmitted to the corresponding pixel electrode 5 through the thin film transistor 8 to achieve charging of the sub-pixels. At this time, the touch electrode layer 70 is used to provide a common electrode voltage, and an electric field is formed between the pixel electrode 5 and the touch electrode layer 70 for driving the deflection of the liquid crystal molecules in the display device, so as to achieve the image display. In a touch phase, the touch electrode layer 70 is used to detect a touch position, and each touch electrode block 7 can receive a touch driving signal and generate a touch detection signal through a single touch signal line 4, so as to achieve the touch detection function.

In the embodiment as shown in FIG. 3, the plurality of sub-pixels 20 includes primary color sub-pixels 21 and mixed color sub-pixels 22. In the sub-pixel row direction x, the mixed color sub-pixels 22 have a width smaller than a width of the primary color sub-pixels 21. It can be understood that various colors of the image displayed by the display panel are generated by superimposing lights of several primary colors, and the sub-pixels corresponding to the lights of the primary colors are the primary color sub-pixels 21. The mixed color sub-pixels 22 refer to sub-pixels which transmit light generated by superimposing lights of several primary colors, and can be used to increase a brightness of the display image of the display panel. As regards the mixed color sub-pixel 22, although the mixed color sub-pixel 22 has a higher light transmittance and can contribute a high brightness of emitted light, a color saturation of the image will be inevitably affected and deviated from its standard value, when a large amount of light of the colors corresponding to the mixed color sub-pixels 22 is emitted. For this reason, the width of the mixed-color sub-pixel 22 in the sub-pixel row direction x can be set to be smaller than the width of the primary color sub-pixel 21 in the sub-pixel row direction x, so as to reduce an open area of the mixed-color sub-pixel 22 and to reduce a number of photons emitted from the mixed-color sub-pixel 22. In this way, the color saturation of the display image can be improved and thus a flicker performance of the display panel can be enhanced.

In an example, the primary color sub-pixels 21 include red sub-pixels, green sub-pixels, and blue sub-pixels. These solid-color sub-pixels are used to provide primary colors and achieve the display of various specific colors in the image.

In an example, the mixed-color sub-pixels 22 include white sub-pixels or yellow sub-pixels.

Figure 11:
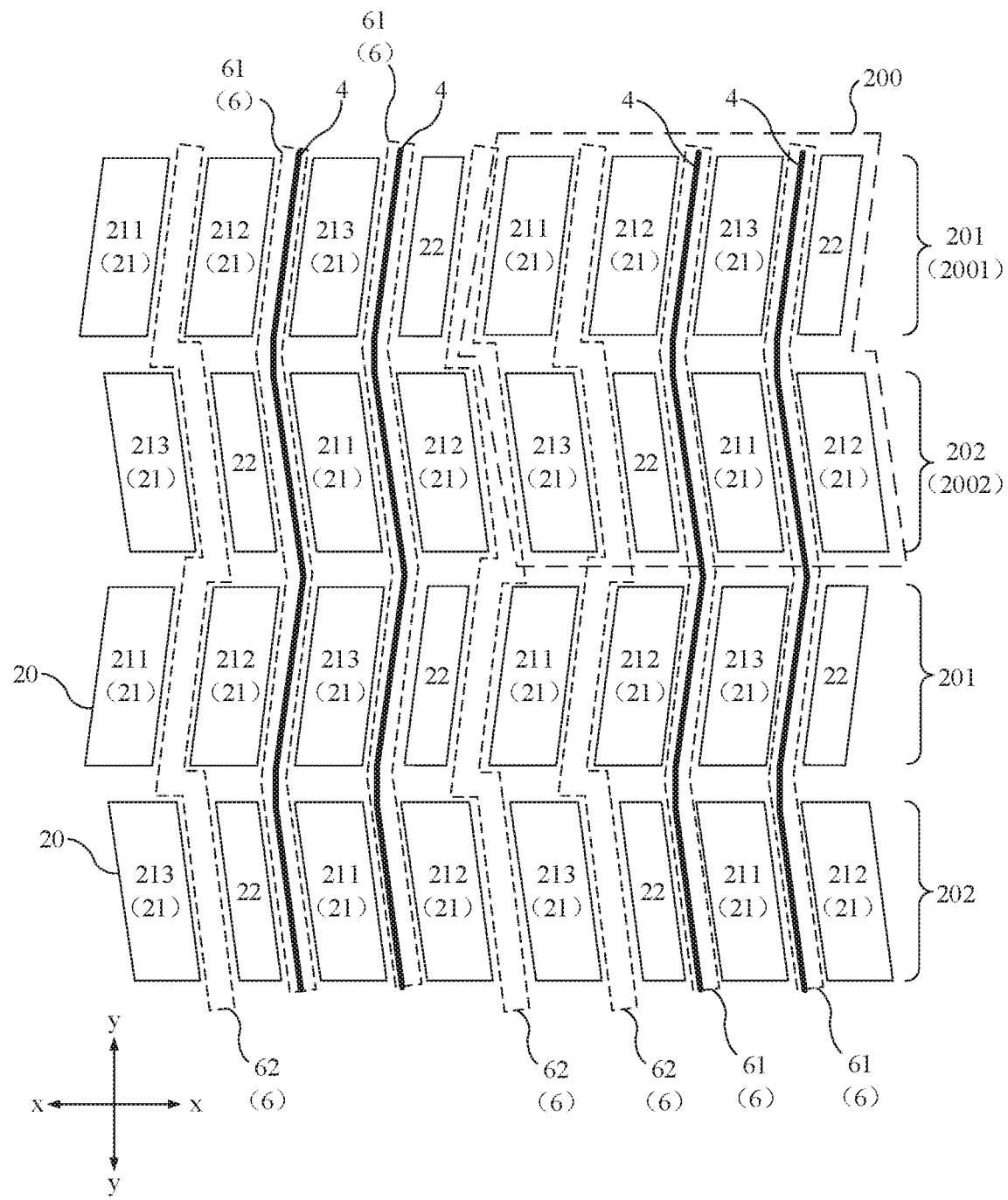
FIG. 11 is a structural schematic diagram of a partial area of a display panel according to another embodiment of the present disclosure.

In an example, as shown in FIGS. 3 and 11, the primary color sub-pixels 21 include first primary color sub-pixels 211, second primary color sub-pixels 212, and third primary color sub-pixels 213. Each of the first primary color sub-pixel 211, the second primary color sub-pixel 212 and the third primary color sub-pixel 213 has a different color. The plurality of sub-pixels 20 includes a plurality of minimal repeating units 200. Each of the minimum repeating units 200 includes a first row of sub-pixels 2001 and a second row of sub-pixels 2002, and the first row of sub-pixels 2001 and the second row of sub-pixels 2002 are arranged along the sub-pixel column direction y. The first row of sub-pixels 2001 of the minimal repeating unit 200 includes the first primary color sub-pixel 211, the second primary color sub-pixel 212, the third primary color sub-pixel 213 and the mixed color sub-pixel 22 sequentially arranged along the sub-pixel row direction x. The second row of sub-pixels 2002 of the minimal repeating unit 200 includes the third primary color sub-pixel 213, the mixed color sub-pixel 22, the first primary color sub-pixel 211, and the second primary color sub-pixel 212 sequentially arranged along the sub-pixel row direction x. In one embodiment, in an embodiment, the first primary color sub-pixel 211 is a red sub-pixel, the second primary color sub-pixel 212 is a green sub-pixel, and the third primary color sub-pixel 213 is a blue sub-pixel.

In the embodiment as shown in FIG. 3, as regards the first row of sub-pixels 2001 of each minimal repeating unit 200, a region between the first primary color sub-pixel 211 and its adjacent second primary color sub-pixel 212 is the first column spacing region 61, a region between the second primary color sub-pixel 212 and its adjacent third primary color sub-pixel 213 is the second column spacing region 62, a region between the third primary color sub-pixel 213 and its adjacent mixed color sub-pixel 22 is the second column spacing region 62, and a region between the mixed color sub-pixel 22 and its adjacent first primary color sub-pixel 211 is the first column spacing region 61. As regards the second row of sub-pixels 2002 of each minimum repeating unit 200, a region between the third primary color sub-pixel 213 and its adjacent mixed color sub-pixel 22 is the first column spacing region 61, a region between the mixed color sub-pixel 22 and its adjacent first primary color sub-pixel 211 is the second column spacing region 62, a region between the first primary color sub-pixel 211 and its adjacent second primary color sub-pixel 212 is the second column spacing region 62, and a region between the second primary color sub-pixel 212 and its adjacent third primary color sub-pixel 213 is the first column spacing region 61.

FIG. 11 is another structural schematic diagram of a partial area of a display panel according to an embodiment of the present disclosure. As shown in FIG. 11, as regards the first row of sub-pixels 2001 of each minimal repeating unit 200, a region between the first primary color sub-pixel 211 and its adjacent second primary color sub-pixel 212 is the second column spacing region 62, a region between the second primary color sub-pixel 212 and its adjacent third primary color sub-pixel 213 is the first column spacing region 61, a region between the third primary color sub-pixel 213 and its adjacent mixed color sub-pixel 22 is the first column spacing region 61, and a region between the mixed color sub-pixel 22 and its adjacent first primary color sub-pixel 211 is the second column spacing region 62. As regards the second row of sub-pixels 2002 of each minimum repeating unit 200, a region between the third primary color sub-pixel 213 and its adjacent mixed color sub-pixel 22 is the second column spacing region 62, a region between the mixed color sub-pixel 22 and its adjacent first primary color sub-pixel 211 is the first column spacing region 61, a region between the first primary color sub-pixel 211 and its adjacent second primary color sub-pixel 212 is the first column spacing region 61, and a region between the second primary color sub-pixel 212 and its adjacent third primary color sub-pixel 213 is the second column spacing region 62. On basis of the arrangement of sub-pixels shown in FIG. 11, it can be ensured that the entire display panel has a greater number of first column spacing regions 61, so that there are more first column spacing regions 61 to arrange the touch signal lines 4.

Figure 12:
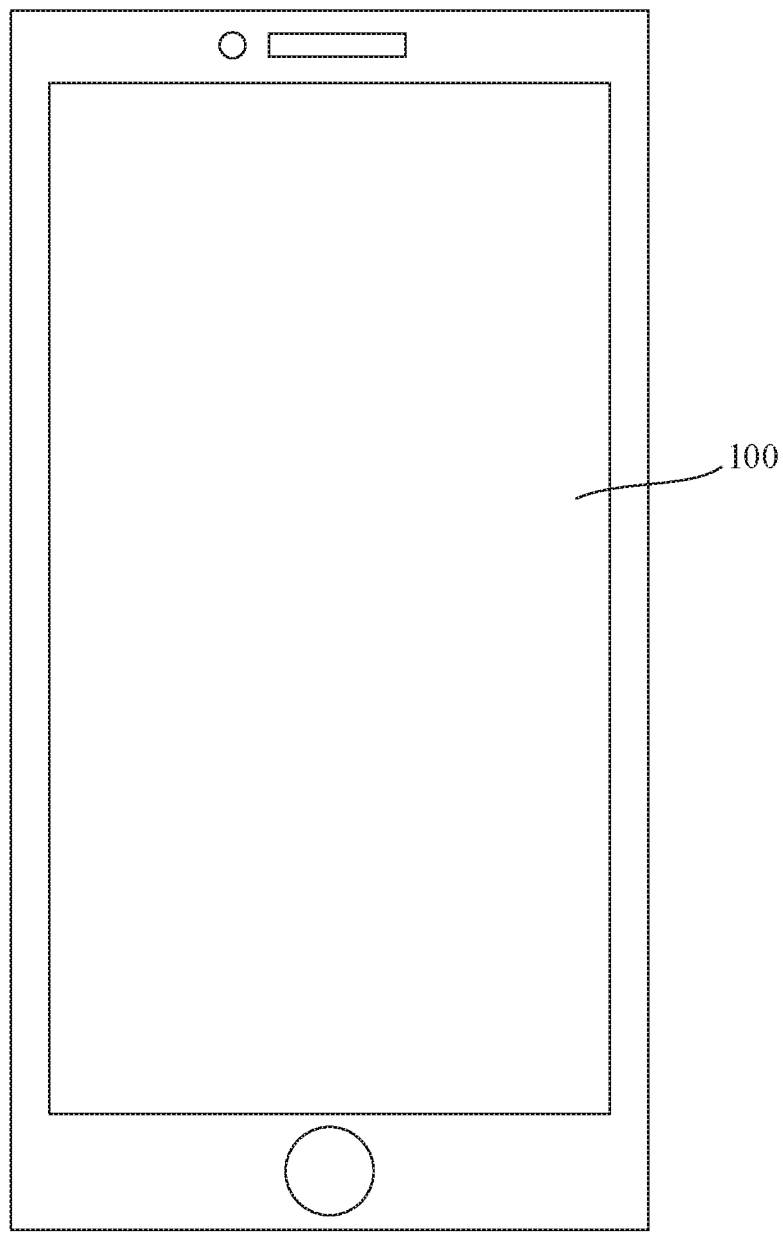
FIG. 12 is a structural schematic diagram of a display device according to an embodiment of the present disclosure.

FIG. 12 is a structural schematic diagram of a display device according to an embodiment of the present disclosure. The embodiments of the present disclosure also provide a display device including the above display panel.

The specific structure of the display panel 100 has been described in details in the above embodiments, and will not be repeated herein. The display device shown in FIG. 12 is merely illustrative, and the display device can be any electronic device having a display function, such as a mobile phone, a tablet computer, a notebook computer, an electronic book, or a television. It can be understood that, the above embodiments merely specifically describe the structure of the array substrate, and the display panel may further include a color film substrate and a liquid crystal layer disposed between the array substrate and the color film substrate.

In the display device according to the present disclosure, the touch signal line is disposed in the first column spacing region having a small turning or even no turning, avoiding a great turning of the touch signal line in the sub-pixel column direction. Even the touch signal line is deviated from the preset position because of the processing error or the like, the probability that there is residual metal of the touch signal line in the drain hole of the planarization layer can be lowered due to the relatively long distance between the touch signal line and the drain hole in the planarization layer. In this way, the related display defects can be improved.

The above embodiments of the present disclosure are merely some embodiments and are not intended to limit the present disclosure. Any modification, equivalent replacement, or improvement within the spirit and principle of the present disclosure shall be included in the scope of the present disclosure.

What is claimed is:

1. A display panel comprising:
   an array substrate, wherein the array substrate comprises:
   a base substrate;
   a source-drain metal layer;
   a planarization layer; and
   a touch signal line,
   wherein the source-drain metal layer, the planarization layer, and the touch signal line are sequentially stacked on the base substrate in a direction perpendicular to the base substrate,
   wherein the source-drain metal layer comprises a drain electrode, the planarization layer comprises a drain hole, and the touch signal line is in direct contact with the planarization layer,
   wherein the array substrate further comprises a pixel electrode, and the pixel electrode is electrically connected to the drain electrode through the drain hole,
   wherein the array substrate comprises a plurality of sub-pixels defined by intersecting a plurality of scan lines with a plurality of data lines in an insulation manner, the plurality of sub-pixels is arranged in an array, and a region between any two adjacent columns of sub-pixels is a column spacing region, wherein the column spacing region includes a first column spacing region, the touch signal line is located in the first column spacing region, and in each column of sub-pixels adjacent to the first column spacing region, adjacent ends of any two adjacent sub-pixels close to the first column spacing region are aligned in a sub-pixel column direction, and wherein the column spacing region further includes a second column spacing region, in each column of sub-pixels adjacent to the second column spacing region, adjacent ends of at least two adjacent sub-pixels close to the second column spacing region are misaligned in the sub-pixel column direction.

2. The display panel according to claim 1, wherein the plurality of sub-pixels comprises a first row of sub-pixels and a second row of sub-pixels alternately arranged in the sub-pixel column direction, wherein each sub-pixel of the plurality of sub-pixels comprises a corresponding pixel electrode, and the pixel electrode comprises strip-liked structures, wherein in the first row of sub-pixels, the stripe-liked structures of the pixel electrode extend along a first direction, and the first direction and the sub-pixel column direction enclose an angle of +θ satisfying 3°≤θ≤20°, and wherein in the second row of sub-pixels, the stripe-liked structures of the pixel electrode extend along a second direction, and the second direction and the sub-pixel column direction enclose an angle of −α satisfying 3°≤α≤20°.

3. The display panel according to claim 2, wherein θ=α.

4. The display panel according to claim 1, wherein a first virtual touch signal line is provided in the second column spacing region, and the first virtual touch signal line comprises a plurality of line segments insulated from one another.

5. The display panel according to claim 1, wherein a first virtual touch signal line or a second virtual touch signal line is provided in any column spacing region other than the column spacing region provided with the touch signal line, wherein the first virtual touch signal line comprises a plurality of line segments insulated from one another, and the second virtual touch signal line comprises a continuously extending strip-liked signal line, wherein as regards the second virtual touch signal line in the second column spacing region, in each of sub-pixels adjacent to the second column spacing region, a portion in which adjacent ends of any two adjacent sub-pixels close to the second column spacing region are aligned in the sub-pixel column direction is a turning position, wherein the second virtual touch signal line has a smaller width at the turning position than a width at other positions; and the second virtual touch signal line has a smaller thickness at the turning position than a thickness at other positions.

6. The display panel according to claim 1, wherein the display panel further comprises a self-capacitive touch electrode layer, and the self-capacitive touch electrode layer comprises a plurality of touch electrode blocks arranged in an array, wherein the touch signal line is electrically connected to one touch electrode block of the plurality of touch electrode blocks through a first through-hole, and wherein the first through-hole is distributed along the touch signal line.

7. The display panel according to claim 1, wherein the plurality of sub-pixels comprises primary color sub-pixels and mixed color sub-pixels, and wherein in a sub-pixel row direction, the mixed color sub-pixels have a width smaller than a width of the primary color sub-pixels.

8. The display panel according to claim 7, wherein the primary color sub-pixels comprise red sub-pixels, green sub-pixels, and blue sub-pixels.

9. The display panel according to claim 7, wherein the mixed color sub-pixels comprise white sub-pixels or yellow sub-pixels.

10. The display panel according to claim 7, wherein the primary color sub-pixels comprise first primary color sub-pixels, second primary color sub-pixels and third primary color sub-pixels, and each of the first primary color sub-pixels, the second primary color sub-pixels and the third primary color sub-pixels has a different color, wherein the plurality of sub-pixels comprises a plurality of minimal repeating units, and each of the plurality of the minimum repeating units comprises a first row of sub-pixels and a second row of sub-pixels arranged along the sub-pixel column direction, wherein the first row of sub-pixels of one of the plurality of minimal repeating units comprises a first primary color sub-pixel, a second primary color sub-pixel, a third primary color sub-pixel and a mixed color sub-pixel that are sequentially arranged along the sub-pixel row direction, and wherein the second row of sub-pixels of one of the plurality of minimal repeating units comprises the third primary color sub-pixel, the mixed color sub-pixel, the first primary color sub-pixel, and the second primary color sub-pixel that are sequentially arranged along the sub-pixel row direction.

11. The display panel according to claim 10, wherein as regards the first row of sub-pixels of each of the plurality of minimal repeating units, a region between the first primary color sub-pixel and its adjacent second primary color sub-pixel is a part of the first column spacing region, a region between the second primary color sub-pixel and its adjacent third primary color sub-pixel is a part of the second column spacing region, a region between the third primary color sub-pixel and its adjacent mixed color sub-pixel is a part of the second column spacing region, and a region between the mixed color sub-pixel and its adjacent first primary color sub-pixel is a part of the first column spacing region, and wherein as regards the second row of sub-pixels of each of the plurality of minimum repeating units, a region between the third primary color sub-pixel and its adjacent mixed color sub-pixel is a part of the first column spacing region, a region between the mixed color sub-pixel and its adjacent first primary color sub-pixel is a part of the second column spacing region, a region between the first primary color sub-pixel and its adjacent second primary color sub-pixel is a part of the second column spacing region, and a region between the second primary color sub-pixel and its adjacent third primary color sub-pixel is a part of the first column spacing region.

12. The display panel according to claim 10, wherein as regards the first row of sub-pixels of each of the plurality of minimal repeating units, a region between the first primary color sub-pixel and its adjacent second primary color sub-pixel is a part of the second column spacing region, a region between the second primary color sub-pixel and its adjacent third primary color sub-pixel is a part of the first column spacing region, a region between the third primary color sub-pixel and its adjacent mixed color sub-pixel is a part of the first column spacing region, and a region between the mixed color sub-pixel and its adjacent first primary color sub-pixel is a part of the second column spacing region, and wherein as regards the second row of sub-pixels of each of the plurality of minimum repeating units, a region between the third primary color sub-pixel and its adjacent mixed color sub-pixel is a part of the second column spacing region, a region between the mixed color sub-pixel and its adjacent first primary color sub-pixel is a part of the first column spacing region, a region between the first primary color sub-pixel and its adjacent second primary color sub-pixel is a part of the first column spacing region, and a region between the second primary color sub-pixel and its adjacent third primary color sub-pixel is a part of the second column spacing region.

13. A display device, comprising:
a display panel, wherein the display panel comprises an array substrate, and the array substrate comprises:
a base substrate;
a source-drain metal layer;
a planarization layer; and
a touch signal line,
wherein the source-drain metal layer, the planarization layer, and the touch signal line are sequentially stacked on the base substrate in a direction perpendicular to the base substrate,
wherein the source-drain metal layer comprises a drain electrode, the planarization layer comprises a drain hole, and the touch signal line is in direct contact with the planarization layer,
wherein the array substrate further comprises a pixel electrode, and the pixel electrode is electrically connected to the drain electrode through the drain hole,
wherein the array substrate comprises a plurality of sub-pixels defined by intersecting a plurality of scan lines with a plurality of data lines in an insulation manner, the plurality of sub-pixels is arranged in an array, and a region between any two adjacent columns of sub-pixels is a column spacing region,
wherein the column spacing region includes a first column spacing region, the touch signal line is located in the first column spacing region, and in each column of sub-pixels adjacent to the first column spacing region, adjacent ends of any two adjacent sub-pixels close to the first column spacing region are aligned in a sub-pixel column direction, and
wherein the column spacing region further includes a second column spacing region, in each column of sub-pixels adjacent to the second column spacing region, adjacent ends of at least two adjacent sub-pixels close to the second column spacing region are misaligned in the sub-pixel column direction.

14. The display device according to claim 13, wherein the plurality of sub-pixels comprises a first row of sub-pixels and a second row of sub-pixels alternately arranged in the sub-pixel column direction,
wherein each sub-pixel of the plurality of sub-pixels comprises a corresponding pixel electrode, and the pixel electrode comprises strip-liked structures,
wherein in the first row of sub-pixels, the stripe-liked structures of the pixel electrode extend along a first direction, and the first direction and the sub-pixel column direction enclose an angle of +θ satisfying $3° ≤ θ ≤ 20°$, and
wherein in the second row of sub-pixels, the stripe-liked structures of the pixel electrode extend along a second direction, and the second direction and the sub-pixel column direction enclose an angle of −α satisfying $3° ≤ α ≤ 20°$.

15. The display device according to claim 13, wherein a first virtual touch signal line is provided in the second column spacing region, and the first virtual touch signal line comprises a plurality of line segments insulated from one another.

16. The display device according to claim 13, wherein a first virtual touch signal line or a second virtual touch signal line is provided in any column spacing region other than the column spacing region provided with the touch signal line,
wherein the first virtual touch signal line comprises a plurality of line segments insulated from one another, and the second virtual touch signal line comprises a continuously extending strip-liked signal line,
wherein as regards the second virtual touch signal line in the second column spacing region, in each of sub-pixels adjacent to the second column spacing region, a portion in which adjacent ends of any two adjacent sub-pixels close to the second column spacing region are aligned in the sub-pixel column direction is a turning position,
wherein the second virtual touch signal line has a smaller width at the turning position than a width at other positions; and/or the second virtual touch signal line has a smaller thickness at the turning position than a thickness at other positions.

17. The display device according to claim 13, wherein the plurality of sub-pixels comprises primary color sub-pixels and mixed color sub-pixels, and
wherein in a sub-pixel row direction, the mixed color sub-pixels have a width smaller than a width of the primary color sub-pixels.

18. The display device according to claim 17, wherein the primary color sub-pixels comprise first primary color sub-pixels, second primary color sub-pixels and third primary color sub-pixels, and each of the first primary color sub-pixels, the second primary color sub-pixels and the third primary color sub-pixels has a different color,
wherein the plurality of sub-pixels comprises a plurality of minimal repeating units, and each of the plurality of the minimum repeating units comprises a first row of sub-pixels and a second row of sub-pixels arranged along the sub-pixel column direction,
wherein the first row of sub-pixels of one of the plurality of minimal repeating units comprises a first primary color sub-pixel, a second primary color sub-pixel, a third primary color sub-pixel and a mixed color sub-pixel that are sequentially arranged along the sub-pixel row direction, and
wherein the second row of sub-pixels of one of the plurality of minimal repeating units comprises the third primary color sub-pixel, the mixed color sub-pixel, the first primary color sub-pixel, and the second primary color sub-pixel that are sequentially arranged along the sub-pixel row direction.

19. The display device according to claim 18, wherein as regards the first row of sub-pixels of each of the plurality of minimal repeating units, a region between the first primary color sub-pixel and its adjacent second primary color sub-pixel is a part of the first column spacing region, a region between the second primary color sub-pixel and its adjacent third primary color sub-pixel is a part of the second column spacing region, a region between the third primary color sub-pixel and its adjacent mixed color sub-pixel is a part of the second column spacing region, and a region between the mixed color sub-pixel and its adjacent first primary color sub-pixel is a part of the first column spacing region, and wherein as regards the second row of sub-pixels of each of the plurality of minimum repeating units, a region between the third primary color sub-pixel and its adjacent mixed color sub-pixel is a part of the first column spacing region, a region between the mixed color sub-pixel and its adjacent first primary color sub-pixel is a part of the second column spacing region, a region between the first primary color sub-pixel and its adjacent second primary color sub-pixel is a part of the second column spacing region, and a region between the second primary color sub-pixel and its adjacent third primary color sub-pixel is a part of the first column spacing region.

20. The display device according to claim 18, wherein as regards the first row of sub-pixels of each of the plurality of minimal repeating units, a region between the first primary color sub-pixel and its adjacent second primary color sub-pixel is a part of the second column spacing region, a region between the second primary color sub-pixel and its adjacent third primary color sub-pixel is a part of the first column spacing region, a region between the third primary color sub-pixel and its adjacent mixed color sub-pixel is a part of the first column spacing region, and a region between the mixed color sub-pixel and its adjacent first primary color sub-pixel is a part of the second column spacing region, and wherein as regards the second row of sub-pixels of each of the plurality of minimum repeating units, a region between the third primary color sub-pixel and its adjacent mixed color sub-pixel is a part of the second column spacing region, a region between the mixed color sub-pixel and its adjacent first primary color sub-pixel is a part of the first column spacing region, a region between the first primary color sub-pixel and its adjacent second primary color sub-pixel is a part of the first column spacing region, and a region between the second primary color sub-pixel and its adjacent third primary color sub-pixel is a part of the second column spacing region.

* * * * *